(12) United States Patent
Fabry (10) Patent No.: US 6,866,605 B2
(45) Date of Patent: Mar. 15, 2005

(54) POWER TRAIN ASSEMBLY (75) Inventor: Mark D. Fabry, Morton, IL (US)

(73) Assignee: Caterpillar Inc, Peoria, IL (US)

( * ) Notice: Subject to any disclaimer, the term of this patent is extended or adjusted under 35 U.S.C. 154(b) by 210 days.

(21) Appl. No.: 10/185,987

(22) Filed: Jun. 28, 2002

(65) Prior Publication Data

US 2004/0000450 A1 Jan. 1, 2004

(51) Int. Cl.[7] .............................................. B62D 11/06
(52) U.S. Cl. ........................................ 475/20; 475/160
(58) Field of Search ................ 475/20, 160; 74/606 R, 74/607

(56) References Cited

U.S. PATENT DOCUMENTS

| | | | |
|---|---|---|---|
| 3,800,913 A | | 4/1974 | Schmitt |
| 4,468,981 A | * | 9/1984 | Ries .......................... 475/225 |
| 5,316,106 A | | 5/1994 | Baedke et al. |
| 5,535,850 A | * | 7/1996 | Tar et al. .................. 184/6.12 |
| 6,092,628 A | | 7/2000 | Hinton et al. |
| 6,345,712 B1 | * | 2/2002 | Dewald et al. ............. 192/221 |

\* cited by examiner

*Primary Examiner*—Dirk Wright
(74) *Attorney, Agent, or Firm*—Steve M Hanley; D J Barnes (57) ABSTRACT

A power train assembly includes an input member drivingly engaged by a power source, at least one output member and at least one gear assembly. The output member is driveably connected to the input member through the gear assembly. A brake assembly is engaged with the output member and a casing is configured to enclose the gear assembly and the brake assembly. The casing includes a main chamber in communication with at least one storage chamber and a reservoir. The storage chamber is adapted to receive a flow of lubrication fluid from the reservoir.

36 Claims, 7 Drawing Sheets

POWER TRAIN ASSEMBLY

TECHNICAL FIELD

The present invention relates generally to a power train assembly of a work machine, and more particularly to an apparatus and method for distribution of fluid through the power train assembly to control temperature and provide lubrication therefore.

BACKGROUND

A typical work machine may include a source of power fitted with a power train assembly to transfer the power from the power source to the power train assembly to do work. One common type of power train system includes a transmission, differential assembly and a pair of final drive assemblies configured to power a pair of ground engaging wheels which propel the work machine. Such power train systems may also be employed with stationary work systems, such as generators and compressors, used to create power or do work. Power train systems and particularly those used in agricultural machines such as tractors or other implement bearing machines typically include a common source of hydraulic fluid used to animate hydraulic implements, lubricate and cool moving power train components and activate steering systems. It is customary to employ a common sump or three interconnected non-pressurized fluid compartments, within the transmission, differential, and final drives assemblies, to lubricate moving componentry therein.

However, known systems employing the common sump may include an inadequate supply of fluid circulating across wet brake assemblies, resulting in elevated brake assembly temperatures. Previous common sump systems also may allow oil aeration which may lead to pump cavitation when the differential gears are allowed to rapidly rotate in a bath of fluid resulting in air being infused or entrained in the fluid. Cavitation may be decreased by limiting the amount of fluid in proximity to the differential. However, if an inadequate amount of lubrication fluid is provided to the differential premature bearing and gear wear may result.

One solution to improper fluid distribution in common sump applications is to increase the size of the fluid pump or add an additional pump to ensure a suitable amount of fluid is being distributed throughout the power train system. Typically, a conventional scavenge system will pull oil from one tank, the transmission sump for example, and dump it to another tank or oil housing such as the differential housing, for example. The addition of a scavenge system, such as the one described, lowers the fluid level in the transmission, to reduce power train parasitics (resistance due to gearing submersion in fluid) which increases fuel efficiency. Scavenge systems also decrease the required volume of fluid required to fill the system which results in a significant savings in cost. Moreover, scavenge systems may improve slope capability of the machine which, without the scavenge system, an abundance of fluid may accumulate in the differential when the machine is operating on a slope or hill.

U.S. Pat. No. 3,800,913 to Schmitt, issued Apr. 2, 1974, assigned to Caterpillar Inc., discloses a scavenge system for use with a power train assembly. An oil recirculation system employs a scavenge pump operative to scavenge the transmission sump and to recirculate oil from an overflow tank to a main supply tank. Although fluid circulation is enhanced, the significant additional costs associated with requiring an additional pump and adapting existing machines with the scavenging system may be undesirable.

A power train system which may overcome one or more of these limitations would be desirable. Furthermore, a power train system which does not significantly add cost relative to known power train assemblies, and one which may be readily adaptable to existing systems is highly desirable.

SUMMARY OF THE INVENTION

The present invention provides a power train assembly including an input member drivingly engaged by a power source, at least one output member and at least one gear assembly. The output member is driveably connected to the input member through the gear assembly. A brake assembly is operative to modify a speed of the output member and a casing is configured to enclose the gear assembly and the brake assembly. The casing includes a reservoir and a main chamber in communication with at least one storage chamber. The storage chamber is adapted to receive a flow of lubrication fluid from the reservoir wherein the brake assembly is adapted to receive the fluid from the storage chamber.

The present invention also provides a method for operating a power train assembly, including storing an amount of fluid in the fluid reservoir; directing fluid from the reservoir into the storage chamber of the casing; and causing fluid to be directed from the storage chamber to the brake assembly.

The present invention further provides a differential and final drive assembly including an input member driveably engaged by a power source, at least one output member, at least one gear assembly and a reduction gear assembly. The output member is driveably connected to the input member through the gear assembly and a brake assembly is engaged with the output member. A casing is configured to enclose the gear assembly and the brake assembly and the casing includes a main chamber in communication with at least one storage chamber. The reduction gear assembly is disposed between the brake assembly and the storage chamber and is structured and arranged with the brake assembly to direct a flow lubrication fluid toward the brake assembly.

The present invention further provides a power train assembly including fluid circulation means for directing fluid through the brake assembly to carry away heat generated by the brake assembly.

BRIEF DESCRIPTION OF THE DRAWINGS

The accompanying drawings, which are incorporated in and constitute a part of this specification, illustrate an exemplary embodiment of the invention and, together with the description, serve to explain the principles of the invention. In the drawings.

Corresponding reference characters indicate corresponding parts throughout the several views. Although the drawings represent an embodiment of the present invention, the drawings are not necessarily to scale and certain features may be exaggerated in order to better illustrate and explain the present invention. The exemplification set out herein illustrates an embodiment of the invention in one form thereof, and such exemplification is not to be construed as limiting the scope of the invention in any manner.

DETAILED DESCRIPTION

Figure 1:
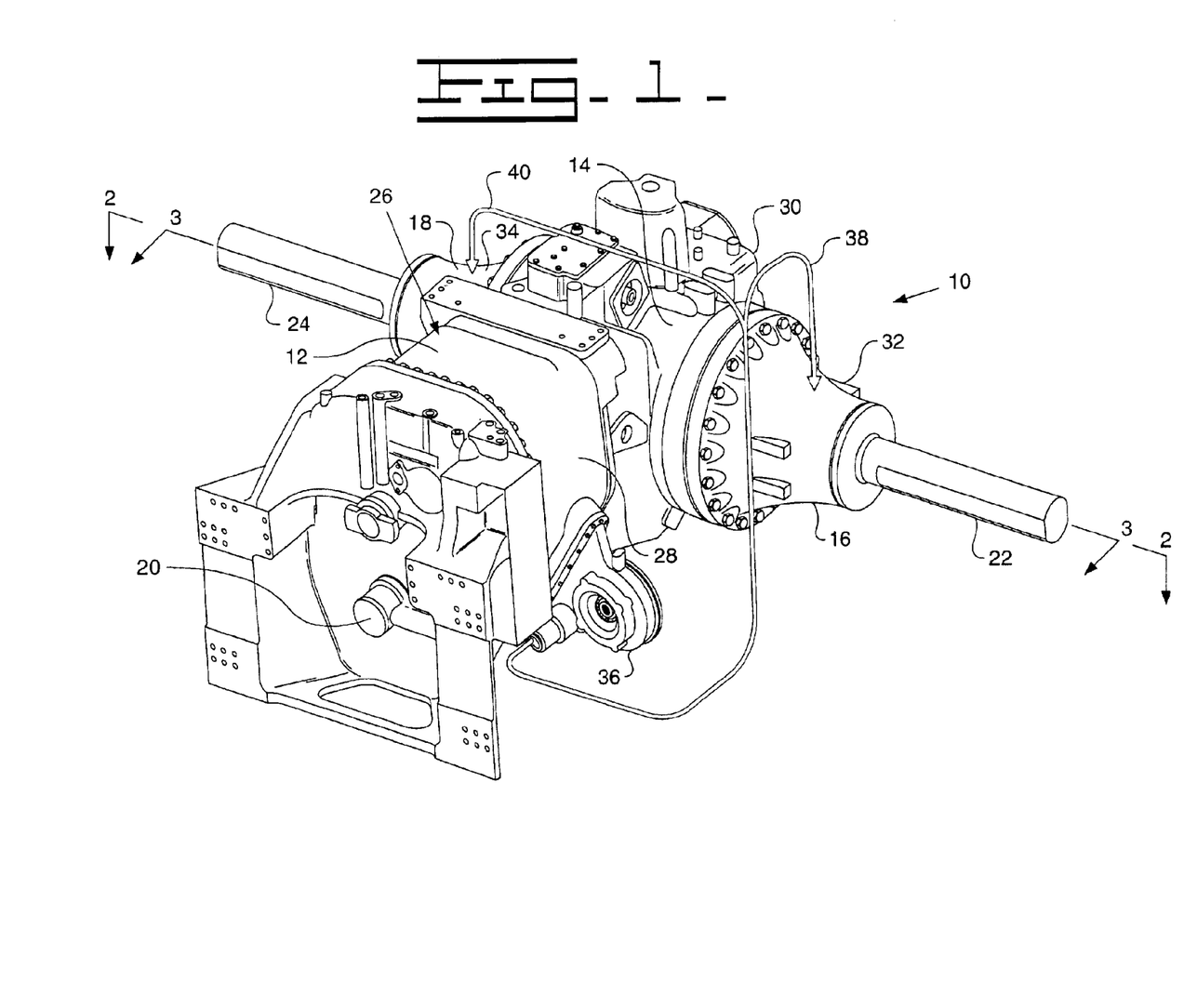
FIG. 1 is a perspective view of a power train assembly in accordance with the present invention.

Referring to FIG. 1, an embodiment of a power train assembly 10 is shown and includes a transmission 12, a differential assembly 14 and first and second final drive assemblies 16, 18. The power train assembly 10 includes an input member 20 and output members 22, 24. The input member 20 may be driven by a power source (not shown) such as an internal combustion engine, for example. In turn, the rotation of the input member 20 is transferred to the output members 22, 24 through the transmission 12, the differential assembly 14 and the final drive assemblies 16, 18 to cause rotation of the output members 22, 24. The output members 22, 24 may be attached to a pair of ground engaging wheels (not shown) to propel a work machine (not shown) as is customary. Alternatively, it is envisioned that the power train assembly may also be used in static environments such as power generation systems and compressor systems, for example. Additionally, it is envisioned that the power train system may be employed with any system known to those having ordinary skill in the art where power is required to be controllably transferred between an input and an output member.

Figure 2:
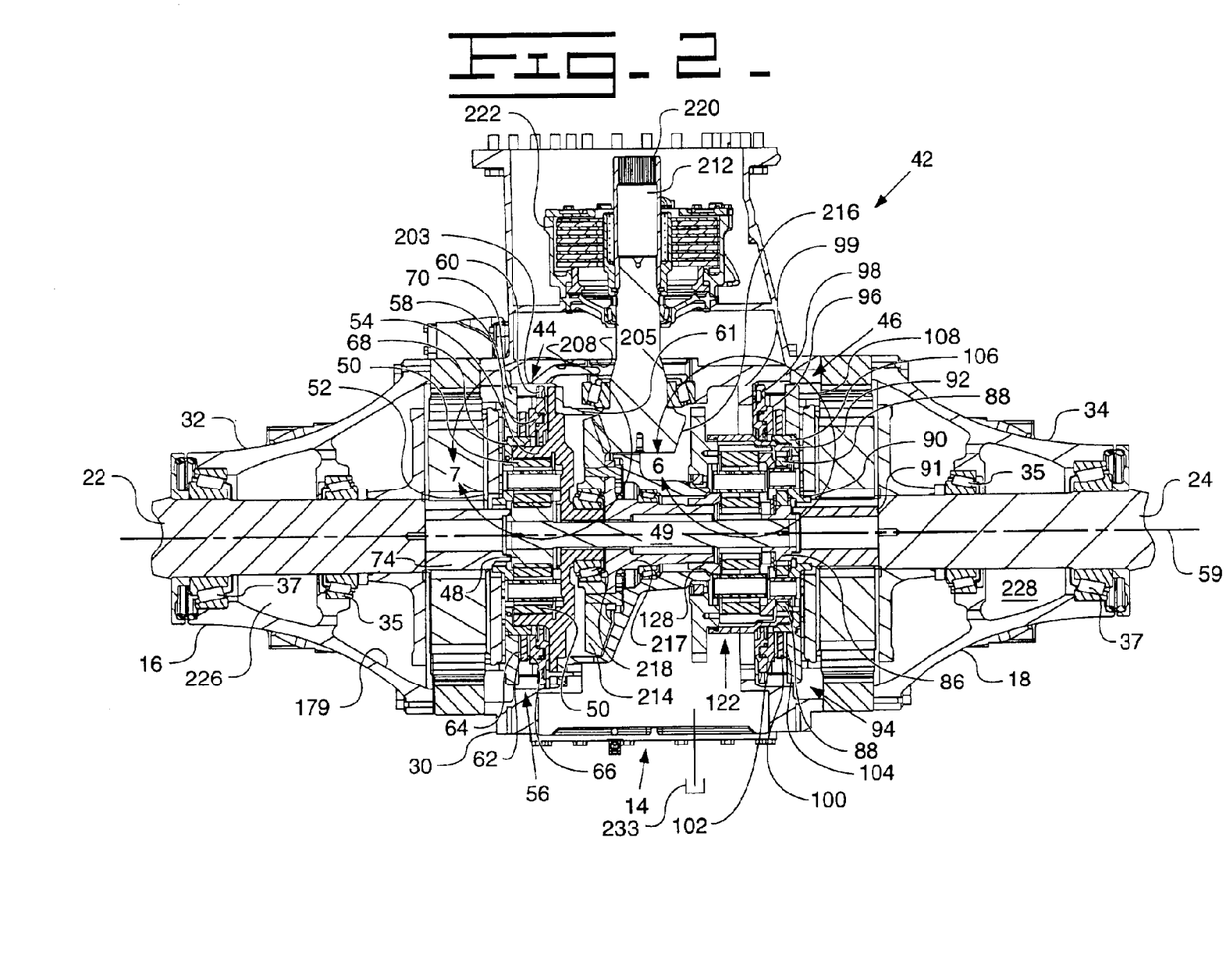
FIG. 2 is a diagrammatic and schematic view of the power train assembly of FIG. 1 taken along line 2—2 of FIG. 1, showing the differential and final drive assembly in section and the transmission removed.

The power train assembly 10 includes a casing assembly 26 including a transmission housing 28, a differential housing 30 and axle housings 32, 34. In an exemplary embodiment the transmission housing 28 may be aligned with the differential housing by way of guide pins and fastened thereto by bolts. Similarly, the axle housings 32, 34 may be attached with the differential housing 30 through bolts and aligned by guide pins. Alternatively, the casing assembly 26 may be manufactured from a single split casing to eliminate the need to assemble multiple housing pieces. As best shown in FIG. 2, the axle housings 32, 34 support the output members 22, 24 through respective inner and outer bearing assemblies 35, 37.

The power train assembly 10 also includes a lubrication pump 36 mounted to the transmission housing 28 and is typically driven by the transmission 12. The lubrication pump 36 provides a flow of lubrication to the power train assembly 10 through the axle housings 32, 34 via fluid conduits 38, 40, respectively.

Referring to FIG. 2, a differential and final drive assembly 42 of the power train assembly 10 (FIG. 1) is shown and includes a first planetary assembly 44 engaged with a second planetary assembly 46 to respectively drive the output members 22, 24. An input planetary 122 is positioned adjacent to the second planetary assembly 46 to cause a controlled speed difference between the output members 22, 24, and accordingly a turning motion (steering) of the machine employing the power train assembly 10. The first planetary assembly 44 includes a sun gear 48 mounted to a shaft 49. Multiple planet gears 50 (such as three planet gears, for example) are in mesh with the sun gear 48 and are rotatably supported on a carrier member 52. The planet gears 50 are in mesh with a ring gear 54.

The differential and final drive assembly 42 includes a first brake assembly 56 which is substantially, concentrically positioned about the perimeter of the first planetary assembly 44. The first brake assembly 56 includes a piston plate 58 which is selectively moveable along an axial reference axis 59 coincident with the centerline of the output members 22, 24. The piston plate 58 is in sealed engagement with a cylinder plate 60 and the cylinder plate 60 is held in abutment with a perimeter portion 61 of the ring gear 54. A brake plate 62 is positioned adjacent the piston plate 58 and includes brake discs 64, 66 respectively attached to opposing faces of the brake plate 62. The brake plate 62 is attached to the carrier 52 of the first planetary assembly 44 by way of a housing 68. A reaction plate 70 is adjacently positioned relative the brake plate 62 and is prevented from movement by being attached to the differential housing 30 by way of fasteners (not shown). A pressure port 72 is provided within the differential housing 30 and provides fluid communication between a source of pressurized fluid (not shown) and the cylinder housing 60. Accordingly, when fluid is provided to the pressure port 72, the piston plate 58 is displaced along reference axis 59 toward the reaction plate 70 and the brake plate 62 and associated brake discs 64, 66 are "pinched" between the reaction plate 70 and the piston plate 58 to slow the rotational speed of the brake plate 62. In turn, since the carrier 52 and a stub shaft 74 are fixed relative to the brake plate 62, the stub shaft 74 and the output member 22, which is splined to the stub shaft 74, are caused to slow when the brake is activated.

Figure 3:
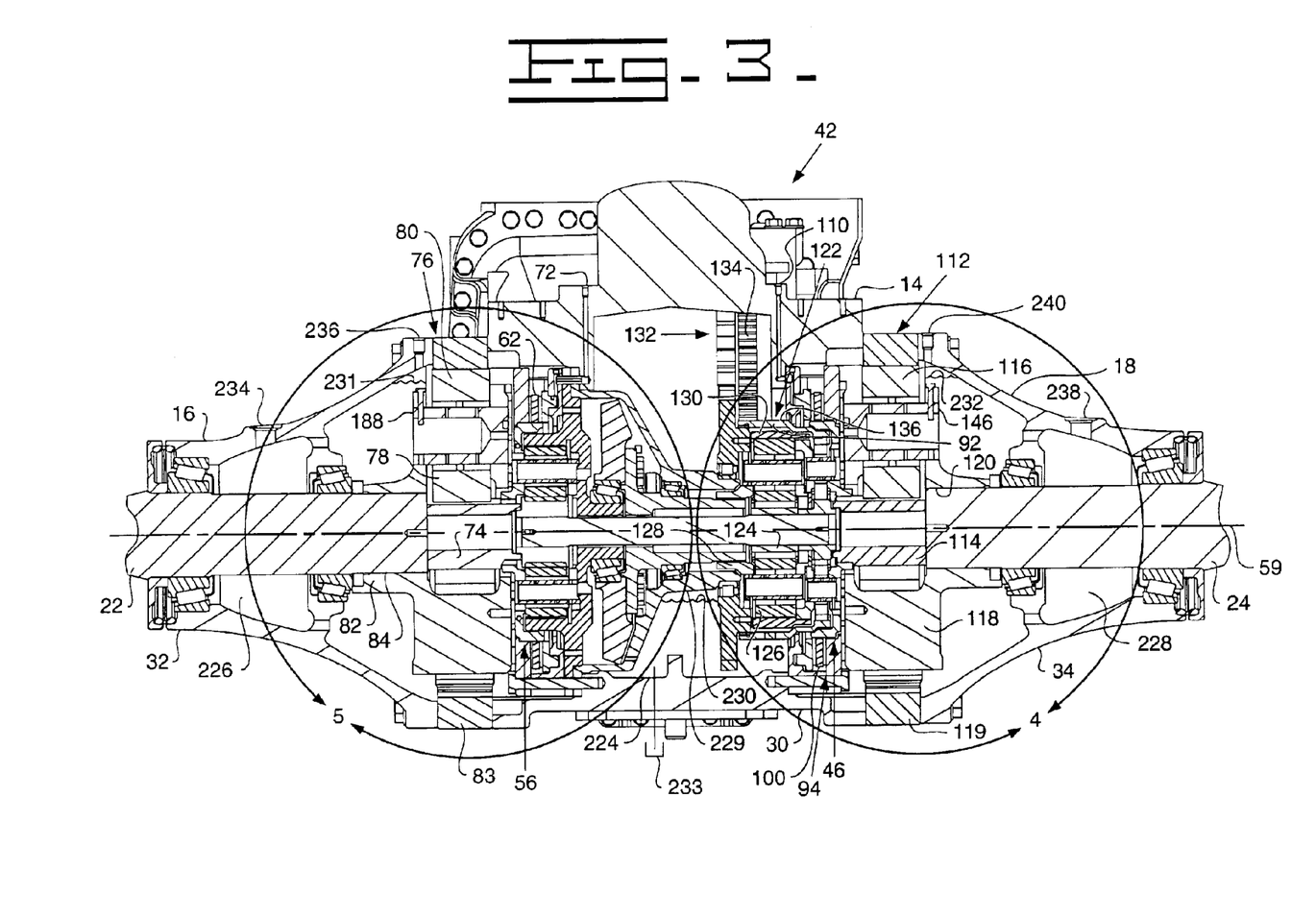
FIG. 3 is a diagrammatic and schematic view of the power train assembly of FIG. 1 taken along line 3—3 of FIG. 1, showing the differential and final drive assembly in section and the transmission removed.

As best shown in FIG. 3, the first final drive assembly 16 includes a reduction gear assembly 76 connected to the stub shaft 74. The reduction gear assembly 76 includes a sun gear 78 in mesh with multiple planet gears 80 (e.g., three planet gears) and a carrier 82 supporting the planet gears 80. An annular ring gear 83 is sandwiched between the differential housing 30 and the first axle housing 32. The ring gear 83 remains fixed such that rotational movement of the sun gear 78 is directly transmitted to rotational movement of the carrier 82. The carrier 82 is driveably engaged with the output member 22 through a spline connection 84 therebetween.

Referring again to FIG. 2, the differential and final drive assembly 42 of the power train assembly 10 includes the second planetary assembly 46 connected to the first planetary assembly 44 through shaft 49. The second planetary assembly includes a sun gear 86 splined to the shaft 49 and in mesh with multiple planet gears 88 (e.g., three planet gears). The planet gears 88 are rotatably supported by a carrier 90 and the carrier 90 is splined with a stub shaft 91 attached to the output member 24. The planet gears 88 are in mesh with a ring gear 92.

A second brake assembly 94 is substantially, concentrically positioned about the perimeter of the second planetary assembly 46 and includes a piston plate 96 selectively moveable along the axial reference axis 59. The piston plate 96 is in sealed engagement with a cylinder plate 98 and the cylinder plate 98 is held in abutment with an internal portion 99 of the differential housing 30. A brake plate 100 is positioned adjacent the piston plate 96 and includes brake discs 102, 104 respectively attached to opposing faces of the brake plate 100. The brake plate 100 is attached to the carrier 90 of the second planetary assembly 46 by way of a housing 106. A reaction plate 108 is adjacently positioned relative to the brake plate 100 and is prevented from movement by being attached to the differential housing 30 by way of fasteners (not shown). A pressure port 110 is provided within the differential housing 30 to establish a hydraulic connection between a source of pressurized fluid (not shown) and the cylinder housing 98 when the brake assembly 94 is activated. Accordingly, when fluid is provided to the pressure port 110, the piston plate 96 is displaced along reference axis 59 toward the reaction plate 108 and the brake plate 100 and associated brake discs 102, 104 are pinched between the reaction plate 108 and the piston plate 96 to slow the rotational speed of the brake plate 100. In turn, since the carrier 90 and the stub shaft 91 are fixed relative to the brake plate 100, the stub shaft 91 and the output member 24, which is splined to the stub shaft 91, are caused to slow when the brake is activated.

As best shown in FIG. 3, the second final drive assembly 18 includes a reduction gear assembly 112 connected to the stub shaft 91. The reduction gear assembly 112 includes a sun gear 114 in mesh with multiple planet gears 116 (e.g., three planet gears) and a carrier 118 supporting the planet gears 116. An annular ring gear 119 is sandwiched between the differential housing 30 and the second axle housing 34. The ring gear 119 remains fixed such that rotational movement of the sun gear 114 is directly transmitted to rotational movement of the carrier 118. The carrier 118 is driveably engaged with the output member 24 through a spline connection 120 therebetween. In an exemplary embodiment the first and second final drive assemblies 16, 18 may be identical to reduce costs otherwise associated with manufacturing, storing and handling separate assemblies. Similarly, where applicable, like components between first and second brake assemblies are used to reduce manufacturing, handling and assembly costs.

Figure 4:
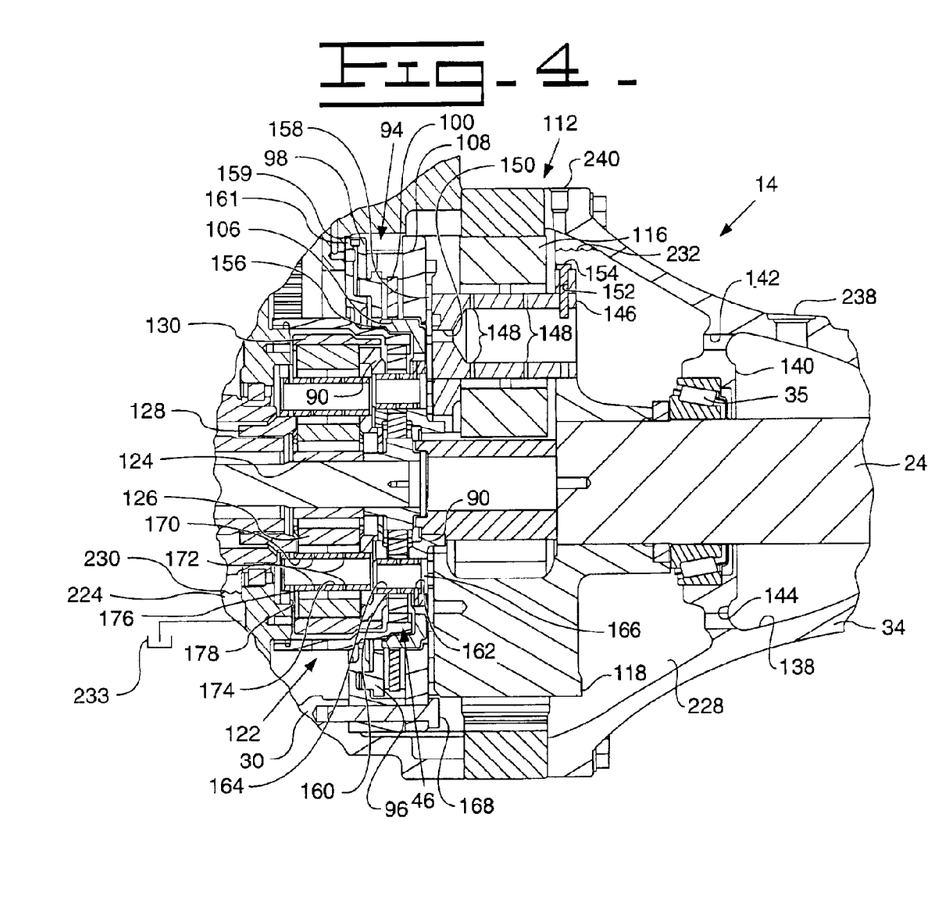
FIG. 4 is an enlarged view of the encircled area shown in FIG. 3.

As best shown in FIGS. 3 and 4, the differential assembly 14 includes an input planetary assembly 122. The input planetary assembly 122 is positioned adjacent to the second planetary assembly 46 and includes a sun gear 124 in mesh with multiple planet gears 126 (e.g., three planet gears) and a carrier 128 rotatably supporting the planet gears 126. The input planetary assembly 122 includes an annular ring gear 130 which is in mesh with the planet gears 128, and additionally, in mesh with the carrier 90 of the second planetary assembly 46.

Referring to FIG. 3, the differential assembly 14 includes a differential steering assembly 132 including an input unit (not shown) connected with a gear 134. The gear 134 is in mesh with an outer circumferential portion 136 of ring gear 92 of second planetary assembly 46. The differential steering assembly 132 allows for selectively changing the speed of the output member 22 relative to the output member 24 to cause a machine (not shown), such as a track type agricultural tractor, for example, employing the differential assembly 14, to steer in a direction toward the side having the slower moving output.

Referring to FIG. 4, the differential assembly 14 includes accommodation for lubrication fluid ("fluid") to freely pass from the second axle housing 34 to the second brake assembly 94 to decrease the operational temperature of the second brake assembly 94 as hereinafter described. In an exemplary embodiment, the second axle housing 34 includes an interior portion 138 having a web 140 and holes 142, 144 therein for fluid to pass therethrough. It may be seen that the carrier 118 of the reduction assembly 112 includes multiple planet supports 146 each having holes 148 extended radially therethrough to allow fluid to pass to the planet gears 116. Additionally, a hole 150 extends axially through the planet support 146. A fastener 154 extends through a hole 152 provided through both the carrier 118 and the planet support 146 to retain and align the planet support 146 upon the carrier 118.

Figure 6:
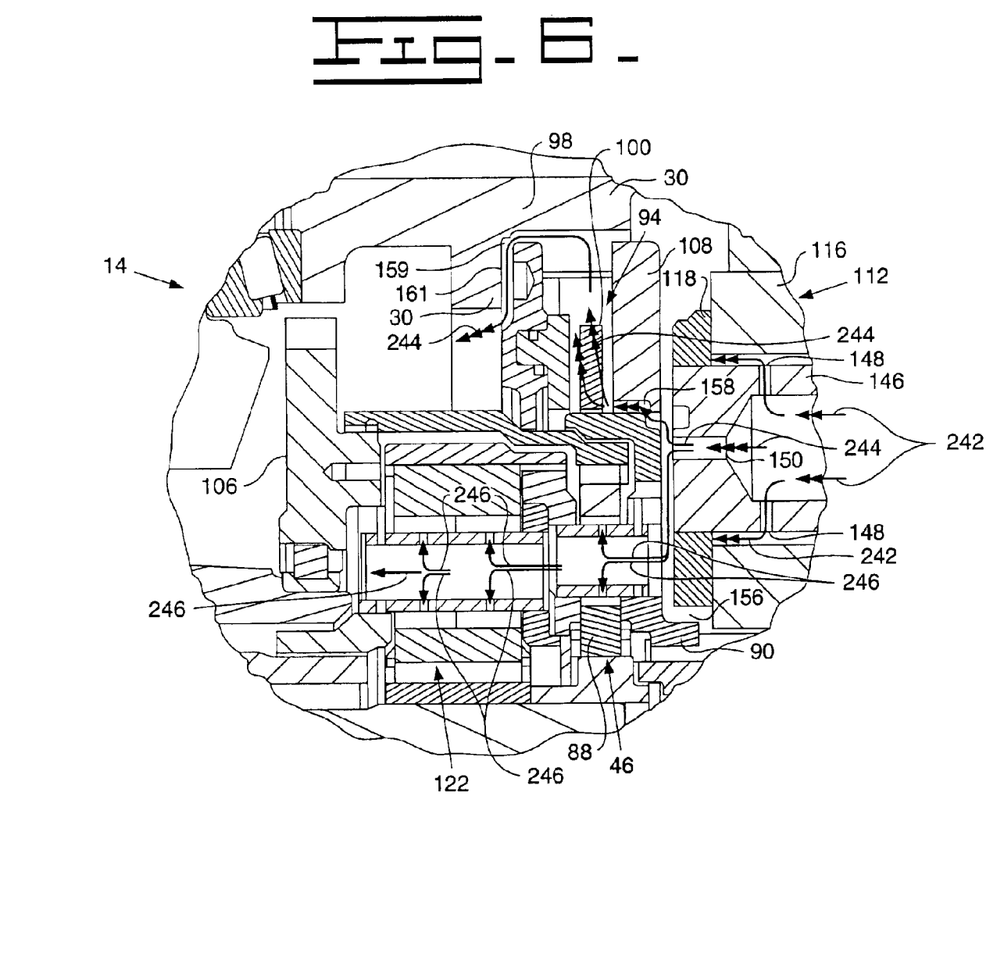
FIG. 6 is an enlarged view of the encircled area shown in FIG. 2, showing the planet support of the final drive assembly cross-sectioned.

To further provide for fluid flow through the second brake assembly 94, an annular space 156 is provided between the reaction plate 108 and the brake plate housing 106 of the carrier 118. The space 156 is positioned adjacent to and overlays the axial through hole 150 in each of the respective planet supports 146. Furthermore, the reaction plate 108 and the carrier 118 are spaced axially apart, creating a space 158 therebetween, to allow fluid to pass to an inner portion of the brake assembly so that the brake is suitably and uniformly cooled (FIG. 6). Additionally, an annular space 159 is provided between the cylinder housing 98 of the second brake assembly 94 and an inner portion 161 of the differential housing 30 (FIG. 6).

Accommodation for fluid to circulate through the input planetary 122 and the second planetary 46 will now be described. The carrier 90 of the second planetary assembly 46 includes multiple planet supports 160, each having a through hole 162 extended radially therethrough. A hole 164 extends axially through each planet support 160. Each planet support 160 is retained and aligned relative to the carrier 90 by a fastener 168 extended through a hole 166 through both the carrier 90 and the planet support 160.

Similarly, the carrier 128 of the input planetary 122 includes multiple planet supports 170, each having through holes 172 extended radially through the planet support 170. A hole 174 extends axially through each planet support 170. Each planet support 170 is retained and aligned relative to the carrier 128 by a fastener 178 extended through a hole 176 in both the carrier 128 and the planet support 170.

Figure 5:
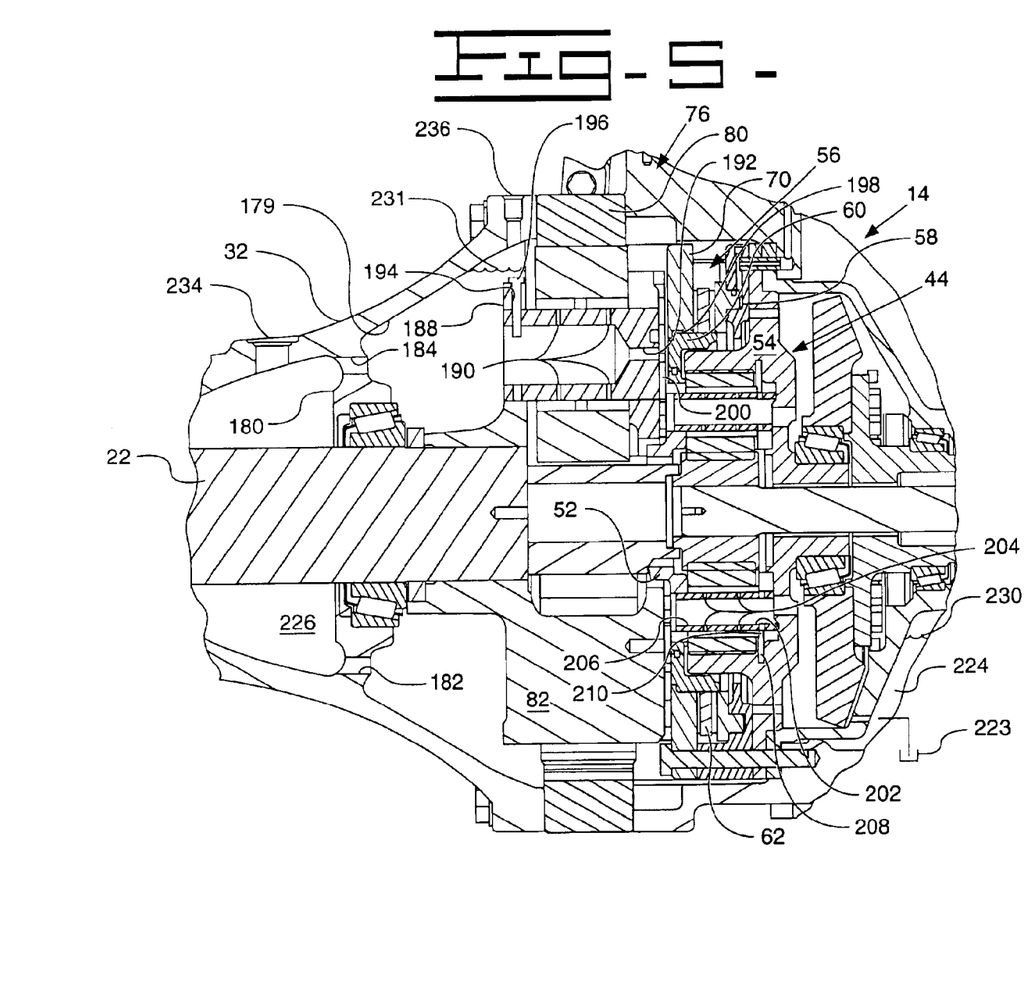
FIG. 5 is an enlarged view of the encircled area shown in FIG. 3.

Referring to FIG. 5, the differential assembly 14 includes accommodation for fluid to freely pass from the first axle housing 32 to the first brake assembly 56 to decrease the operational temperature of the first brake assembly 56 as hereinafter described. In an exemplary embodiment, the first axle housing 32 includes an interior portion 179 having a web 180 and holes 182, 184 therein for fluid to pass therethrough to allow fluid movement toward each planet gear 80. It may be seen that the carrier 82 of the reduction assembly 76 includes a planet support 188 having holes 190 extended radially therethrough. Additionally, a hole 192 extends axially through the planet support 188. A hole 194 is provided through both the carrier 82 and the planet support 188 and a fastener 196 extends through the hole 194 to retain and align the planet support 188 on the carrier 82.

Figure 7:
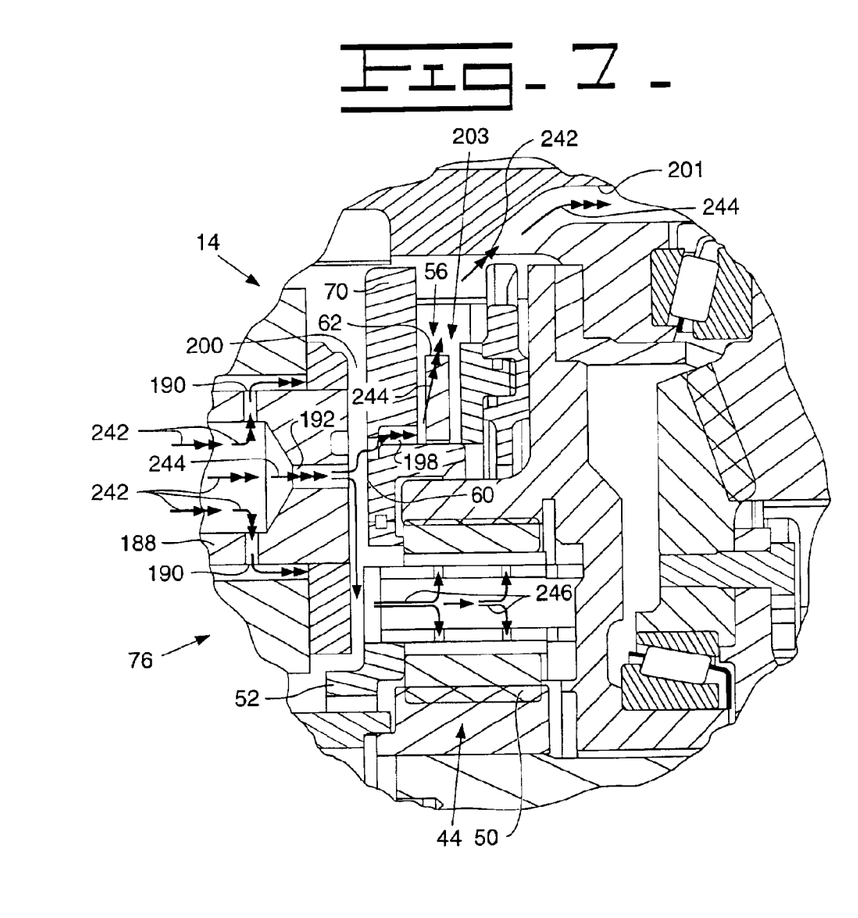
FIG. 7 is an enlarged view of the encircled area shown in FIG. 2, showing the planet support of the final drive assembly cross-sectioned.

To further provide for fluid flow directed toward the first brake assembly 56, an annular space 198 is provided between the reaction plate 70 and the brake plate housing 60 (FIG. 7). The space 198 is positioned adjacent to and overlaying the axial through hole 192 in each of the respective planet supports 188 (FIG. 7). Furthermore, the reaction plate 70 and the carrier 54 are spaced axially apart, creating a space 200 therebetween to allow fluid to pass to an inner portion of the brake assembly such that the brake assembly is suitably and uniformly cooled. As best shown in FIG. 7, a passage 201 allows movement of fluid from an area 203 in proximity of the first brake assembly 56 to an area 205 in proximity to the bevel pinion 216 (FIG. 2). The passage 201 allows fluid collecting near the periphery of the brake plate 62 to be directed to the bevel pinion 216, resulting in the movement of heated fluid away from the first brake assembly 56.

The first planetary assembly 44 also includes fluid passages to increase the circulation of fluid flow through the first brake assembly 56. The carrier 52 of the first planetary assembly 44 includes multiple planet supports 202, each having through holes 204 extended radially therethrough. A hole 206 extends axially through each planet support 202 to allow fluid to move axially through the support 220. Each planet support 202 is retained and aligned relative to the ring gear 54 by a fastener 208 extended through a hole 210 through both the ring gear 54 and the planet support 202.

Referring to FIG. 2, the differential assembly 14 is driveably connected to the transmission 12 (FIG. 1) through a drive member 212. The drive member 212 may include a bevel pinion 216. The bevel pinion 216 is in mesh with a bevel gear 214 attached to a collar member 217 which drives the carrier 128 of the input planetary assembly 122. A bearing 218, such as a frusto-conical roller bearing assembly for example, provides support and alignment for rotating bevel gear 214. The drive member 212 also includes a splined end 220 which is engaged by a matching male spline (not shown) provided by an output shaft (not shown) of the transmission 12. A brake assembly 222 is engageable with the drive member 212 to provide additional brake capabilities, in addition to first and second brake assemblies 56, 94. For example, the brake assembly 222 may serve as a parking brake for a machine employing the power train assembly 10.

Referring to FIGS. 3 and 4, the differential housing 30 forms a main fluid chamber 224, and the first and second axle housing 32, 34 provide fluid storage chambers 226 (FIG. 5) and 228. The main fluid chamber 224 includes a fluid level 230 which is generally in the vicinity of a bottom portion 229 of the bevel pinion 216 (FIG. 3). Preferably, the fluid level 230 is 22 mm below the centerline 59 of the output members 22, 24 (FIG. 3). The storage chambers 226 (FIG. 5), 228 include respective fluid levels 231, 232. The fluid levels 231 (FIG. 5) and 232 are preferably elevated such that each storage chamber 226 and 228 is substantially full of fluid. Notably, fluid is free to flow from the storage chambers 226, 228 and into the main chamber 224. However, the fluid accumulating in the main chamber 224 is scavenged to provide the fluid level 230 at a prescribed height.

As best shown in FIGS. 2 and 3, the power train assembly 10 (FIG. 1) includes a fluid reservoir 233 which may be a sump provided within the transmission housing 28 containing an amount of fluid therein. The main fluid chamber 224, within the differential 14 is in fluid communication with the fluid reservoir 233 through a spillway (not shown) residing between the differential 14 and the transmission 12. The spillway may be positioned within the differential housing 30 to maintain the fluid level 230 at the prescribed height. Alternatively, a scavenge pump (not shown) may be employed to draw fluid from the main chamber 224 to provide additional removal of fluid from the main chamber 224 to maintain the prescribed height for fluid level 230. It is envisioned that yet another alternative may include utilizing the pump 36 to draw fluid from the main chamber 224 to maintain the level 230.

Referring to FIGS. 3 and 5, the first axle housing 32 includes a fluid scavenge inlet 234 and a pressure flow inlet 236. Fluid from the reservoir 233 is urged, via pump 36 (FIG. 1), to the pressure flow inlet 236 preferably at a flow rate of 4 gallons per minute, for example, to provide suitable lubrication of the reduction gear assembly 76 and the first planetary assembly 44. An additional supply of fluid is scavenged from the reservoir 233 and thereafter provided to the fluid scavenge inlet 234 to ensure that the fluid level 231 is maintained. The fluid scavenge inlet 234 is in fluid communication with the fluid reservoir 233 through the fluid conduit 38 (FIG. 1). It is envisioned that and the fluid supplied to the fluid scavenge inlet 234 may be provided by the pump 36 (FIG. 1).

Referring to FIGS. 3 and 4, the second axle housing 34 includes a fluid scavenge inlet 238 and a pressure flow inlet 240. Fluid from the reservoir 233 is urged, via pump 36 (FIG. 1), to the pressure flow inlet 240 preferably at a flow rate of 11 gallons per minute, for example, to provide suitable lubrication of the reduction gear assembly 112, the input planetary assembly 122 and the second planetary assembly 46. An additional supply of fluid is scavenged from the reservoir 233 and thereafter provided to the fluid scavenge inlet 238 to ensure that the fluid level 232 is maintained. The fluid scavenge inlet 238 is in fluid communication with the fluid reservoir 233 through the fluid conduit 40 (FIG. 1). It is envisioned that the fluid supplied to the fluid scavenge inlet 238 may be provided by the pump 36 (FIG. 1).

INDUSTRIAL APPLICABILITY

Referring to FIG. 2, in operation, the transmission 12 (FIG. 1) is driven by the power source (not shown) to provide rotatable output to the bevel pinion 216 of the drive member 212 within the differential 14. In turn, torque is transferred from the rotating drive member 212 to the first and second planetary assemblies 44, 46. The first and second planetary assemblies 44, 46 rotatingly drive the final drive assemblies 16, 18 to, consequently, transfer torque to the output members 22, 24.

A machine such as a track type machine for example, employing the power train assembly 10 (FIG. 1) may be steered by causing one of the output members 22, 24 to momentarily rotate at a different speed than the other output member, causing the machine to veer in the direction of the slower moving output member. An increase in speed of the output member 24 is executed by causing the ring gear 92 to speed up by activating the differential steering assembly 132 (FIG. 3). The output members 22, 24 may be slowed, independently or dependently relative one another, through brake assemblies 56, 94.

Referring to FIG. 5, the first brake assembly 56 is engaged when pressure is selectively applied to pressure port 72 (FIG. 3), which, in turn, causes piston plate 58 to move toward the reaction plate 70 pinching the brake plate 62 therebetween. In a similar fashion and as best shown in FIG. 4, the second brake assembly 94 is engaged when pressure is selectively applied to the pressure port 110 (FIG. 3), which, in turn, causes piston plate 96 to move toward the reaction plate 108 pinching the brake plate 100 therebetween.

Referring to FIG. 3, as a result of the brake assemblies 56, 94 being engaged, a significant amount of heat is generated about the brake plates 62, 100. Yet, the power train assembly 10 (FIG. 1) provides strategically placed fluid passages in combination with a circulatory motion of fluid about the brake assemblies to provide significantly decreased brake assembly operating temperatures as compared to heretofore employed power train systems. By introducing fluid into each of the axle housings 32, 34 through the respective scavenging inlets 234, 238, the fluid flows directly toward the brake assemblies 56, 94 through respective planet supports 188, 146 of reduction gear assemblies 76, 112.

Referring to FIG. 6, it may be seen that the fluid entering the planet supports 146 of the reduction gear assembly 112 flows through the radially positioned cross-holes 148 and through the axially arranged face hole 150 of each of the planet supports 146. The fluid flows through the planet support 146 at a moderate speed and is represented by flow arrows 242. The fluid flow is then directed radially, inward through the second planetary assembly 46 and the second brake assembly 94, indicated by flow arrows 246. Notably, fluid flow 246 is directed to the planets 88 and the carrier 90 of the second planetary assembly 46 through the space 156 between the reaction plate 108 and the reduction gear assembly 112. In general, under operating conditions which require low travel speeds (e.g., 4 MPH), such as a "tilling" operation of an agricultural tractor employing the power train assembly 10, it is desirable to direct the fluid radially inward (toward centerline 59 (FIG. 2)) to ensure significant lubrication and cooling of the planetary gears and bearings, especially in high-torque applications. Specifically, the annular space 156 between the reaction member 108 and the carrier 118 provides a passage to allow fluid to flow to the second planetary assembly 46 and the input planetary 122.

In contrast, when the output member 24 is subject to rapid rotation, fluid introduced to the differential 14 from the final drive 34 is then flung radially outward, toward the brake assembly 94, indicated by flow arrows 244. Since the hole 150 in each planet support overlays the space 158 between the brake plate housing 106 and the reaction plate 108, the flow 244 is effectively directed toward the brake plate 100 without significantly diminishing the speed of the flow 244. As a result, significant amounts of fluid at a high speed impinge the brake plate 100 to reduce heat and lubricate the brake assembly 94. In general, under operating conditions which require high travel speeds (e.g., 25 MPH), such as a "roading" operation of an agricultural tractor employing the power train assembly 10, it is desirable to direct the fluid radially outward to ensure significant cooling of the brake assembly 94. Significant brake cooling may be particularly applicable in high-speed applications wherein significant machine momentum is converted to heat when the brakes are applied and the machine is duly slowed.

In addition to directing fluid flow 244 to the brake plate 100, fluid relief accommodations are provided to create a circulatory motion of fluid for additional movement of heated fluid away from the brake plate 100. Specifically, the annular space 159 between the cylinder housing 98 of the second brake assembly 94 and the differential housing 30, provides a relief to allow heated fluid to be carried away from the brake plate 100.

Referring to FIG. 7, it may be seen that the fluid entering the planet supports 188 of the reduction gear assembly 76 flows through the radially positioned cross-holes 190 and through the axially arranged face hole 192 of each of the planet supports 188. The fluid flows through the planet support 188 at a moderate speed and is represented by flow arrows 242. The fluid flow is then directed radially, inward through the first planetary assembly 44 and the first brake assembly 56, indicated by flow arrows 246. Notably, fluid flow 246 is directed to the planets 50 and the carrier 52 of the first planetary assembly 44 through the space 200 between the reaction plate 70 and the reduction gear assembly 76. In general, under operating conditions which require low travel speeds (e.g., 4 MPH), such as a tilling operation of an agricultural tractor employing the power train assembly 10, it is desirable to direct the fluid radially inward (toward centerline 59 (FIG. 2) to ensure significant lubrication and cooling of the planetary gears and bearings, especially in high-torque applications. Specifically, the annular space 200 between the reaction member 70 and the carrier 242 provides a passage to allow fluid to flow to the first planetary assembly 44.

In contrast, when the output member 22 is subject to rapid rotation, fluid introduced to the differential 14 from the final drive 32 is then flung radially outward, toward the brake assembly 56, indicated by flow arrows 244. Since the hole 192 in each planet support overlays the space 198 between the brake plate housing 60 and the reaction plate 70, the flow 244 is effectively directed toward the brake plate 62 without significantly diminishing the speed of the flow 244. As a result, significant amounts of fluid at a high speed impinge the brake plate 62 to reduce heat and lubricate the brake assembly 56. In general, under operating conditions which require high travel speeds (e.g., 25 MPH), such as a "roading" operation of an agricultural tractor employing the power train assembly 10, it is desirable to direct the fluid radially outward to ensure significant cooling of the brake assembly 56. Significant brake cooling may be particularly applicable in high-speed applications wherein significant machine momentum is converted to heat when the brakes are applied and the machine is duly slowed.

In addition to directing fluid flow 244 to the brake plate 62, fluid relief accommodations are provided to create a circulatory motion of fluid for additional movement of heated fluid away from the brake plate 62. Specifically, the passage 201 within the differential housing 30 provides a relief to allow heated fluid to be carried away from the brake plate 62.

Referring to FIG. 3, the distribution of fluid within the power train assembly 10 (FIG. 1) will now be described. The power train assembly 10 includes non-pressurized fluid collected within the transmission 12, the differential 14 and the final drive assemblies 16, 18. In an exemplary embodiment, the fluid reservoir 233 is within the transmission housing 28 (FIGS. 2 and 3). The level of fluid 230 in the main chamber 224, within the differential 14, for example, is at a prescribed height (at least to the lower portion 229 of the bevel gear 216). To ensure that the level does not significantly exceed this height, excess fluid is scavenged or urged from the main chamber 224 and deposited into the reservoir 233. The fluid is scavenged or removed from the main chamber, being reclaimed by the reservoir 233, through gravity feed, a pump or through suction or by any other method known to those having ordinary skill in the art. Fluid accumulating in the reservoir 233, in turn, is pumped (via pump 36) into the storage chambers 226, 228, preferably maintaining the same substantially full of fluid. Moreover, since fluid being pumped into the storage chambers 226, 228 is pressurized the fluid is urged from the storage chamber 226, 228 to the main chamber 224 through the respective reduction assemblies 76, 112 and brake assemblies 56, 94 to effectively dissipate heat generated by the brake plates 62, 100. As a result, the fluid levels 231, 232 within the storage chambers are maintained to provide substantially full chambers and the main chamber is maintained at 22 mm below the centerline 59 (FIG. 3) for example. In so doing, the fluid within the main chamber 224 is prone to little if any aeration or air entrainment of the fluid.

The circulation of fluid through the power train assembly 10 will now be described. In operation, fluid is pumped by the pump 36 (FIG. 1) from the reservoir 233 to the final drives 16, 18. Specifically, the pump 36 provides fluid to the pressure flow inlets 236, 240 to lubricate the reduction gear assemblies 76, 112. Additionally, fluid is scavenged from the differential 14 and dumped to the scavenge ports 234, 238 of the final drives 16, 18. Notably, by dumping the fluid to the slower moving reduction gear assemblies, as compared to the fast rotating pinion gear and differential assembly, the mixing of air within the fluid is significantly decreased. Consequently, pump cavitation is significantly decreased since there exists little if any air entrained in the fluid. Also, by filling the storage chambers within the final drives the differential oil level could be reduced which lessens parasitic losses caused by fast moving differential components being slowed due to their submersion in fluid. Also, since the storage chambers of the final drive assemblies are substantially full of fluid and the differential includes an insignificant amount of fluid a machine employing the power train assembly 10 may engage significant slopes and sustain adequate lubrication of the final drives since the fluid level will be virtually unaffected by the slope.

It will be apparent to those skilled in the art that various modifications and variations can be made in the disclosed power train assembly without departing from the scope or spirit of the invention. Other embodiments of the invention will be apparent to those skilled in the art from consideration of the specification and practice of the invention disclosed herein. It is intended that the specification and examples be considered as exemplary only.

What is claimed is:

1. A power train assembly comprising:
   an input member drivingly engaged by a power source;
   at least one output member;
   at least one gear assembly, said at least one output member being driveably connected to said input member through said at least one gear assembly;
   a brake assembly operative to modify a speed of said at least one output member; and
   a casing configured to enclose said at least one gear assembly and said brake assembly, said casing comprising: a main chamber in communication with at least one storage chamber and a reservoir, said at least one storage chamber being adapted to receive a flow of lubrication fluid from said reservoir,
   wherein said brake assembly is adapted to receive said fluid from said at least one storage chamber.

2. The power train assembly of claim 1 wherein said at least one storage chamber is defined by an axle housing.

3. The power train assembly of claim 1 wherein said main chamber is defined by a differential housing.

4. The power train assembly of claim 1 wherein said reservoir is defined by a transmission housing.

5. The power train assembly of claim 1 wherein said casing is comprised of at least two portions.

6. The power train assembly of claim 5 wherein said casing constitutes a split casing.

7. The power train assembly of claim 1 wherein said casing comprises said transmission housing, said differential housing and said at least one axle housing.

8. The power train assembly of claim 7 wherein said at least one axle housing is in fluid communication with the transmission housing through a conduit.

9. The power train assembly of claim 8, further comprising a pump, said pump is operative to urge fluid from said transmission housing to said at least one axle housing through said conduit.

10. The power train assembly of claim 1 wherein said brake assembly is configured to receive fluid being successively urged through said storage chamber and said main chamber.

11. The power train assembly of claim 10 further comprising a pump operative to urge fluid into said storage chamber.

12. The power train assembly of claim 1 further comprising: first and second final drive assemblies, a second gear assembly; a second output member; a second brake assembly; and a second storage chamber, said second output member being driveably connected to said input member through said second gear assembly, said second brake assembly is operative to modify a speed of said second output member, said first final drive assembly is engaged with said gear assembly and said second final drive assembly is engaged with said second gear assembly, said first and second storage chambers are configured to receive fluid from said reservoir, said first brake assembly is configured to receive fluid from said storage chamber through said first final drive assembly and said second brake assembly is configured to receive fluid from said second storage chamber through said second final drive assembly.

13. The power train assembly of claim 1 wherein said brake assembly is configured to receive fluid being successively urged through said storage chamber and said main chamber.

14. The power train assembly of claim 1 further comprising a reduction gear assembly disposed between the at least one gear assembly and a fluid scavenge input configured to receive fluid from said reservoir.

15. The power train assembly of claim 1 wherein said at least one storage chamber is configured to be substantially full of fluid.

16. The power train assembly of claim 1, further comprising fluid circulation means for directing fluid through said brake assembly to carry away heat generated by said brake assembly.

17. A method for operating a power train assembly, the power train assembly comprising: an input member; at least one output member; at least one gear assembly, said output member being driveably connected to said input member through said at least one gear assembly; a brake engagable with the at least one output member and being operative to modify a speed of the output member; a fluid reservoir; and a casing comprising: a main chamber configured to enclose said at least one gear assembly and a storage chamber, the method comprising:
   storing an amount of fluid in the fluid reservoir;
   directing fluid from the reservoir into the storage chamber of the casing; and
   causing fluid to be directed from the storage chamber to the at least one brake assembly.

18. The method of claim 17 further comprising: drawing fluid from the main chamber and discharging fluid to the reservoir.

19. The method of claim 17 further comprising: directing fluid from the storage chamber to the at least one gear connection dependent on a first speed range of the at least one output member.

20. The method of claim 17 further comprising: directing fluid from the storage chamber to the brake assembly dependent on a first speed range of the at least one output member.

21. The method of claim 17 further comprising: urging fluid from the reservoir into the main chamber through a second storage chamber.

22. The method of claim 17 further comprising: limiting flow from the at least one storage chamber to the main chamber through a reduction gear assembly.

23. A differential and final drive assembly comprising:
   a driveably engageable drive member;
   at least one output member;
   at least one gear assembly, said output member being driveably connected to said drive member through said at least one gear assembly;

a brake assembly operative to modify a speed of said at least one output member;

a casing configured to enclose said at least one gear assembly and said brake assembly, said casing comprising: a main chamber in communication with at least one storage chamber; and a reduction gear assembly disposed between said brake assembly and said storage chamber, said reduction gear assembly being structured and arranged with said brake assembly to direct a flow of lubrication fluid toward said brake assembly.

24. The differential and final drive assembly of claim 23 wherein said main chamber is configured to sustain a fluid level therein at predetermined distance below a centerline of the at least one output member.

25. The differential and final drive assembly of claim 23 further comprising a second output member, said output member and said second output member being urged to rotate in response to rotation of said drive member.

26. The differential and final drive assembly of claim 23 wherein said brake assembly is attached to said at least one gear assembly.

27. The differential and final drive assembly of claim 23 further comprising a second gear assembly and a second brake assembly, said gear assembly and said second gear assembly being rotatably driven by said drive member.

28. The differential and final drive assembly of claim 27 further comprising a third gear assembly adapted to engage with one of said gear assembly or said second gear assembly to cause a difference in rotational speeds of said output member and a second output member connected to said second gear assembly.

29. The differential and final drive assembly of claim 23 wherein said reduction gear assembly includes at least one planet support, said planet support is adapted to direct fluid toward said at least gear assembly.

30. The differential and final drive assembly of claim 29 wherein said at least one planet support includes at least one radially disposed hole adapted to provide fluid to said at least one gear assembly and an axially disposed hole adapted to provide fluid to said brake assembly.

31. The differential and final drive assembly of claim 23 wherein said brake assembly comprises a rotatable brake plate disposed between a reaction member and an axially moveable piston plate.

32. The differential and final drive assembly of claim 31 wherein said reaction member defines a space, said brake plate adapted to receive fluid from said at least one storage chamber through said space.

33. The differential and final drive assembly of claim 32 wherein fluid is directed through said space dependent on a speed of said at least one output member.

34. The differential and final drive assembly of claim 32 wherein said planet support of said reduction gear member is configured to direct fluid toward said space within said reaction member.

35. The differential and final drive assembly of claim 32 further comprising a cylinder plate attached to said casing and adapted to support said piston plate, said cylinder plate and said casing including a space therebetween to allow fluid to circulate through said brake assembly.

36. The differential and final drive assembly of claim 32 further comprising a cylinder plate attached to said casing and adapted to support said piston plate, said casing including a passage therein to allow fluid to circulate through said brake assembly.

* * * * *